US005128184A

United States Patent [19]

Benefield

[11] Patent Number: 5,128,184

[45] Date of Patent: Jul. 7, 1992

[54] MODIFICATION OF WET SLEEVE IN A DIESEL ENGINE

[76] Inventor: Michael W. Benefield, P.O. Box 181, Adel, Ga. 31620

[21] Appl. No.: 463,487

[22] Filed: Jan. 11, 1990

[51] Int. Cl.[5] .............................................. B32B 27/00

[52] U.S. Cl. .................................. 428/35.7; 123/668; 138/145; 138/DIG. 3; 277/181; 165/133; 428/36.1; 428/36.9; 428/36.92; 428/421

[58] Field of Search .................... 428/35.7, 36.1, 34.5, 428/36.9, 421, 36.92; 138/145, DIG. 3; 165/133; 192/331; 123/668; 277/181

[56] References Cited

U.S. PATENT DOCUMENTS

| | | | |
|---|---|---|---|
| 2,907,103 | 10/1959 | Lewis et al. | 138/DIG. 3 |
| 3,050,786 | 8/1962 | St John et al. | 138/DIG. 3 |
| 3,878,312 | 4/1975 | Bergh et al. | 138/145 |
| 4,116,016 | 9/1978 | Roop et al. | 165/133 |
| 4,173,670 | 11/1979 | Van Auken | 428/34.5 |
| 4,282,905 | 8/1981 | Dopkin et al. | 428/36.1 |
| 4,461,347 | 7/1984 | Layton et al. | 165/133 |
| 4,724,819 | 2/1988 | Fleri | 123/668 |
| 4,822,061 | 4/1989 | Kammeraad | 277/181 |
| 4,889,009 | 12/1989 | Friedermann et al. | 192/3.31 |

*Primary Examiner*—James J. Seidleck
*Assistant Examiner*—Archene Turner

[57] ABSTRACT

A wet sleeve from a diesel engine is coated with Teflon in the area which will be in contact with the water from the cooling system. The Teflon coating will prevent the sleeves from being pitted from the boiling of the water against the sleeve.

1 Claim, 1 Drawing Sheet

MODIFICATION OF WET SLEEVE IN A DIESEL ENGINE

BACKGROUND OF THE INVENTION

1. Field of the Invention

The present invention relates to diesel engines. More specifically, the present invention relates to the wet sleeve pitting problem.

2. Prior Art

Wet sleeve engines have a problem in the pitting of the outside of the sleeve. Cooling system water boils on the outside of the sleeve where the water contacts it. The boiling action and air bubbles created, beats the sleeve causing pitting. This process is gradual under normal conditions and is accelerated when the cooling system is contaminated with dirt and rust. Catapillar Equipment Company has tried to solve this problem by installing a cooling system filter on the engine. The filter has slowed the process of pitting but has not eliminated the problem.

SUMMARY OF THE INVENTION

The principal object of the present invention is to prevent pitting of the wet sleeves in a diesel engine. I have discovered the solution to this problem. The solution to the problem is coating the wet sleeve with Teflon where the sleeve will be in contact with water from the cooling system. The Teflon coating will absorb the pounding of the air bubbles as the water boils around the sleeve. The cooling system filter is necessary for the removal of dirt and rust which would remove the Teflon.

DETAILED DESCRIPTION

Figure 1:
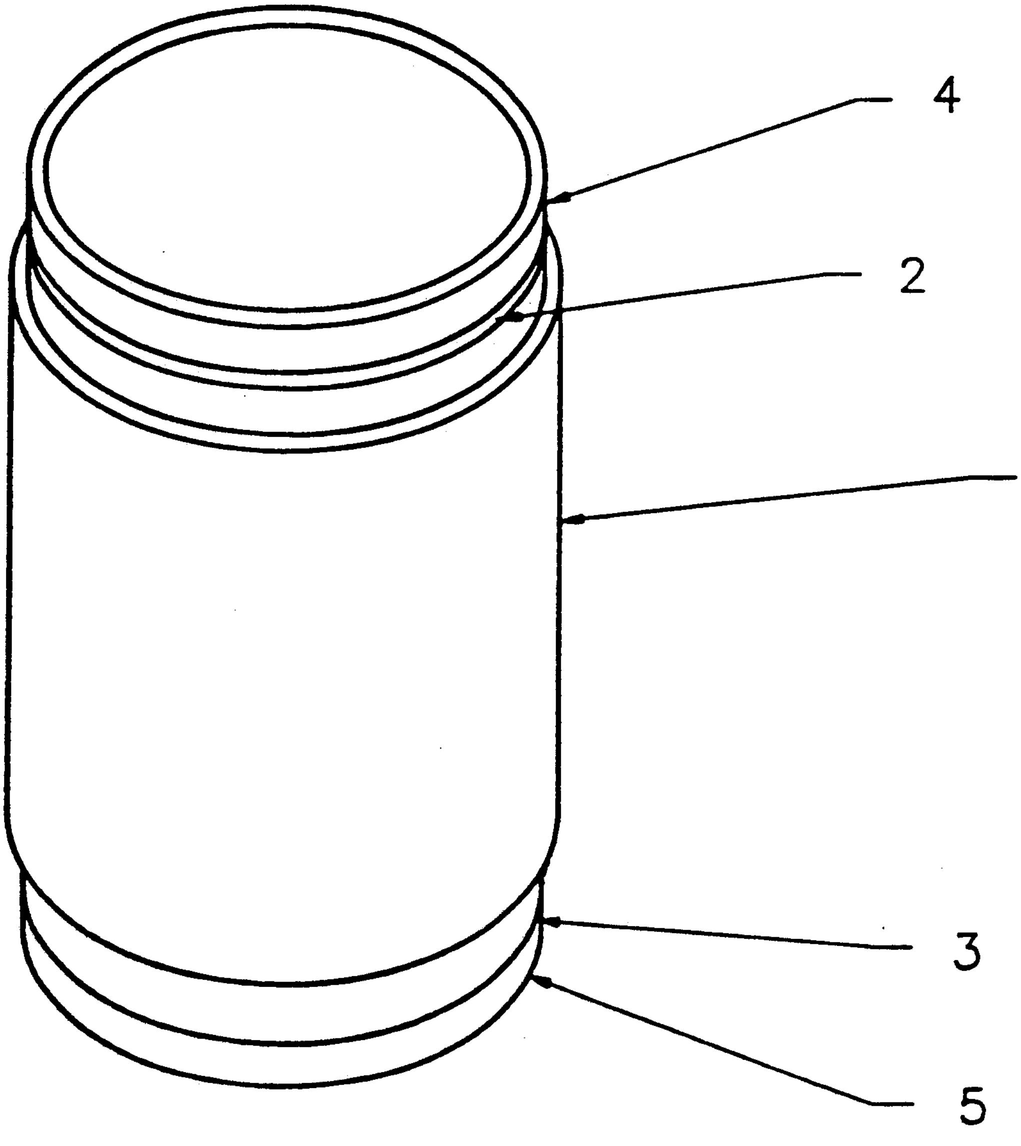
FIG. 1 is a side elevation of a wet sleeve with the Teflon coating on the outside area that comes in contact with water from the cooling system.

As shown in the drawing, the wet sleeve with a Teflon coating in accordance with the present invention. The area 1 is the area coated with Teflon that will come in contact with water from the cooling system. Part 2 and 3 are the grooves that seals are held in which seal the wet sleeve to the engine block, thus preventing cooling system water from mixing with the engine oil. The top 4 and bottom 5 of the wet sleeve are two areas tapered to fit snuggly into the engine block.

I claim:

1. A coated wet sleeve comprising a wet sleeve cylinder of an internal combustion engine having an outside surface, and a Teflon coating on said outside surface to inhibit erosion of the wet sleeve.

* * * * *